United States Patent [19]
Kamei et al.

[11] Patent Number: 5,874,176
[45] Date of Patent: Feb. 23, 1999

[54] RESIN COMPOSITE CONTAINING POLYAMIDE MATRIX AND POLYOLEFINE GRAINS DISPERSED THEREIN

[75] Inventors: Eiichi Kamei; Yukihiko Asano; Kiyoshi Tsuruzawa; Yutaka Matsudomi, all of Hirakata, Japan

[73] Assignee: UBE Industries, Ltd., Yamaguchi, Japan

[21] Appl. No.: 915,139

[22] Filed: Aug. 20, 1997

Related U.S. Application Data

[63] Continuation of Ser. No. 443,575, May 17, 1995, abandoned.

[30] Foreign Application Priority Data

May 20, 1994 [JP] Japan ..................................... 6-107032
Jul. 22, 1994 [JP] Japan ..................................... 6-171187

[51] Int. Cl.⁶ .................................................. B32B 27/08
[52] U.S. Cl. .......................... 428/474.4; 428/500; 525/66
[58] Field of Search ................................ 428/474.4, 500; 525/66

[56] References Cited

U.S. PATENT DOCUMENTS

| | | | |
|---|---|---|---|
| 4,174,358 | 11/1979 | Epstein | 525/183 |
| 4,375,532 | 3/1983 | Baer | 525/31 C |
| 4,495,324 | 1/1985 | Chacko et al. | 524/504 |
| 4,788,249 | 11/1988 | Maresca et al. | 525/66 |
| 4,988,764 | 1/1991 | Nishio et al. | 525/66 |
| 5,162,422 | 11/1992 | Lausberg et al. | 524/504 |
| 5,234,993 | 8/1993 | Huynh-Ba | 525/66 |
| 5,288,799 | 2/1994 | Schmid et al. | 525/6 |
| 5,489,648 | 2/1996 | Okimura et al. | 525/71 |

FOREIGN PATENT DOCUMENTS

| | | |
|---|---|---|
| 64-51458 | 2/1964 | Japan . |
| 42-12546 | 7/1967 | Japan . |
| 45-30945 | 10/1970 | Japan . |
| 54-123158 | 9/1979 | Japan . |
| 55-9661 | 1/1980 | Japan . |
| 55-44108 | 11/1980 | Japan . |
| 56-9943 | 3/1981 | Japan . |
| 57-8246 | 1/1982 | Japan . |
| 59-149940 | 8/1984 | Japan . |
| 59-232135 | 12/1984 | Japan . |
| 60-110740 | 6/1985 | Japan . |
| 60-118735 | 6/1985 | Japan . |
| 60-262853 | 12/1985 | Japan . |
| 62-13379 | 3/1987 | Japan . |
| 62-223250 | 10/1987 | Japan . |
| 62-223251 | 10/1987 | Japan . |
| 63-53218 | 10/1988 | Japan . |
| 64-421 | 1/1989 | Japan . |
| 64-87652 | 3/1989 | Japan . |
| 1-146942 | 6/1989 | Japan . |
| 2-42109 | 9/1990 | Japan . |
| 2-42379 | 9/1990 | Japan . |
| 3-109452 | 4/1991 | Japan . |
| 3-91560 | 4/1991 | Japan . |
| 3-115342 | 5/1991 | Japan . |
| 3-146552 | 6/1991 | Japan . |
| 3-207735 | 9/1991 | Japan . |
| 5-8939 | 2/1993 | Japan . |
| 5-70669 | 10/1993 | Japan . |

*Primary Examiner*—Helen L. Pezzuto
*Attorney, Agent, or Firm*—Armstrong, Westerman, Hattori, McLeland & Naughton

[57] ABSTRACT

In a resin composite, polyolefine grains are dispersed in a polyamide matrix. Each of the polyolefine grains has a core made of an unmodified polyolefine and a shell made of another polyolefine that is modified. In one embodiment, the core is made of a crystalline polypropylene resin (C), and the shell is made of modified copolymer (B) having ethylene units and α-olefine units. The modified copolymer (B) may have the α-olefine units as a major component. The resin composite has 30 to 80 percents by weight of polyamide (A), 1 to 30 percents by weight of the modified copolymer (B), and 19 to 69 percents by weight of the crystalline polypropylene resin (C) wherein the sum of the polyamide, the modified copolymer, and the crystalline propylene resin is 100 percents by weight. In another embodiment, the core is made of an unmodified copolymer (E) having ethylene units and α-olefine units, and the shell is made of a modified crystalline polypropylene resin (D). The copolymer may have the ethylene units as a major component. The resin composite has 30 to 80 percents by weight of the polyamide (A), 5 to 50 percents by weight of the modified crystalline polypropylene resin (D), and 5 to 65 percents by weight of the copolymer (E) wherein the sum of the polyamide, the modified crystalline polypropylene resin, and the copolymer is 100 percents by weight. The unmodified crystalline polypropylene resin (C) is modified with at least one of α,β-unsaturated caboxylic acid and α,β-unsaturated caboxylate to give the modified crystalline polypropylene resin (D). The resin composite has both the properties possessed by polyamide and the properties possessed by polyolefine in good balance, and further has properties that are not sufficiently possessed by the polyamide or polyolefine, specifically, low warpage upon molding, good dimensional stability and good impact resistance.

20 Claims, 4 Drawing Sheets

RESIN COMPOSITE CONTAINING POLYAMIDE MATRIX AND POLYOLEFINE GRAINS DISPERSED THEREIN

This application is a continuation of application Ser. No. 08/443,575 filed May 17, 1995, now abandoned.

BACKGROUND OF THE INVENTION

1. Field of the Invention

The present invention relates to a thermoplastic resin composite, particularly a resin composite comprising a polyamide and polyolefines, which is low in water absorption and superior in dimensional stability, rigidity, toughness and moldability. The thermoplastic resin composite of the present invention finds wide applications in mechanical parts, automobile parts, electric or electronic parts, etc.

2. Description of Related Art

Polyamide resins, being well balanced in mechanical properties, heat resistance, chemical resistance and moldability, find wide applications in electrical or electronic parts, automobile parts, etc. However, the polyamide resins are prone to absorb moisture. Upon the absorption, the polyamide resins show large dimensional change and large reduction in mechanical properties such as bending strength, modulus of elasticity and the like. Accordingly, the polyamide resins are not suitable in parts requiring dimensional accuracy, and their improvement is desired.

On the other hand, polypropylene is lightweight, low in water absorption, superior in melt flowability, and low in cost, and is used in a large amount in automobile parts and electrical parts. However, polypropylene has insufficient heat resistance, strength and rigidity. Polypropylene tends to crystallize and has a large mold shrinkage coefficient so that upon molding, dimensional accuracy is limited. Hence, polypropylene may per se have limited applications.

In order to improve the dimensional change of polyamide caused by water absorption, it was proposed to introduce a monomer unit into the main chain of polyamide by copolymerization, and the monomer units consisting of an aromatic dicarboxylic acid, an aromatic diamine or a salt thereof by copolymerization. Alternatively, a polyamide may be blended with a polymer having low water absorption. The polymer having low water absorption includes crystalline resins and synthetic rubbers, which may be made of one of polypropylene modified by an unsaturated carboxylic acid or a derivative thereof, ethylene, and a copolymer having the propylene units and ethylene units.

For example, Japanese Patent Application Kokai (Laid-Open) No. 12546/1967 discloses a thermoplastic resin composition comprising 50–99% by weight of a polyamide and 50–1% by weight of an unsaturated carboxylic acid-olefine copolymer, which has improved compatibility. The resin composition has excellent mechanical properties, particularly excellent rupture property but does not satisfy all of low water absorption, rigidity and heat resistance.

Japanese Patent Publication No. 30945/1970 discloses a method of manufacturing a resin composition comprising an olefine polymer, a polyamide and/or a polyester, and a polyolefine modified with at least one of acids, esters, amides, acid anhydrides and epoxy group. The resin composition has satisfactory dispersion and is suitable for use in fibers. However, upon injection molding or extrusion, the composition shrinks, thereby the molded article having inferior dimensional accuracy and insufficient impact resistance.

Japanese Patent Application Kokai (Laid-Open) No. 262853/1985 discloses a polyamide resin composition comprising a polyamide and a modified ethylene-propylene block copolymer, which has low water absorption. In the resin composition, the water absorption of polyamide is reduced to a certain extent without significantly sacrificing its rigidity and heat resistance. However, the water absorption level of the resin composition is still insufficient.

Japanese Patent Application Kokai (Laid-Open) No. 223250/1987 discloses a resin composition obtained by kneading a crystalline polyolefine with a polyamide and an unsaturated carboxylic acid derivative and further kneading the resulting modified polyolefine with a polyamide and a polyolefine. The resin composition has low water absorption, excellent tensile strength and excellent surface gloss. The resin composition, however, does not satisfy both of rigidity and impact resistance.

Japanese Patent Application Kokai (Laid-Open) No. 223251/1987 discloses a resin composition having excellent impact resistance, obtained by adding, to the above resin composition, an ethylene-$\alpha$-olefine copolymer of low crystallinity. The resin composition has improved water absorption, but has low rigidity and does not satisfy both of low water absorption and mechanical properties.

The above-mentioned Japanese Patent Application Kokai (Laid-Open) No. 223250/1987 also discloses a resin composition comprising a crystalline polyolefine, a polyamide and a small amount of a crystalline polyolefine modified by an unsaturated carboxylic acid. The resin composition, however, does not satisfy all of low water absorption, rigidity and impact resistance.

Japanese Patent Application Kokai (Laid-Open) No. 51458/1989 discloses a polyamide resin composition comprising a polyamide resin, a crystalline polypropylene modified by unsaturated carboxylic acid and an ethylene-$\alpha$-olefine copolymer modified by an unsaturated carboxylic acid. The polyamide resin composition gives a small dimensional change upon water absorption and has excellent rigidity and impact resistance. The polyamide resin composition, being rich in the polyamide component, has excellent mechanical properties, but is still insufficient in water absorption and does not fully satisfy both of low water absorption and mechanical properties.

Japanese Patent Application Kokai (Laid-Open) No. 87652/1989 discloses a polypropylene resin composition having excellent impact resistance, comprising a partially modified crystalline propylene-ethylene block copolymer, a polyamide and a modified ethylene-$\alpha$-olefine copolymer. The composition contains a polypropylene as a matrix and a polyamide as a dispersed phase, thereby having improved heat resistance and mechanical properties as compared with the polypropylene. However, the compositions has significantly inferior rigidity and heat resistance as compared with the polyamide.

Japanese Patent Application Kokai (Laid-Open) No. 146942/1989 discloses compositions each comprising 40–60% by weight of a modified polyolefine copolymer grafted with an unsaturated carboxylic acid or a derivative thereof and 60–40% by weight of a polyamide. In these compositions, the incorporation of the modified polyolefine of relatively high molecular weight having an melt flow rate of 2.0 g or less per 10 minutes improves the rigidity, water resistance and weld strength. However, the compositions do not improve impact resistance; the mold shrinkage coefficient is high; the dimensional stability upon molding is low; and the melt does not sufficiently flow.

Japanese Patent Application Kokai (Laid-Open) No. 91560/1991 discloses a polyamide resin composition comprising 100 parts by weight of polyamide, 1–100 parts by weight of a modified polyolefine, 5–250 parts by weight of a polypropylene resin, 0.01–3.0 parts by weight of an organic heat stabilizer and 0.1–5.0 parts by weight of a particular carbon black. The polyamide resin composition does not age much upon heating. The polyamide resin composition, however, has insufficient impact resistance and dimensional stability upon molding.

Japanese Patent Application Kokai (Laid-Open) No. 109452/1991 discloses a resin composition comprising 10–89.9 parts by weight of a polypropylene resin, 10–89.9 parts by weight of a polyamide, 0.1–5 parts by weight of an unsaturated carboxylic acid-modified polyolefine, 0–30 parts by weight of an impact improver and 0–60 parts by weight of a reinforcing agent, wherein the resin composition is 100 parts by weight. The resin composition shows excellent toughness, rigidity and heat deformation stability, but has insufficient melt flowability during molding and insufficient lightweightness.

Japanese Patent Application Kokai (Laid-Open) No. 115342/1991 discloses a resin composition comprising 94–50% by weight of a polypropylene, 1–40% by weight of a modified polyolefine and 5–40% by weight of a polyamide, wherein the ratio of the melt viscosity of the polyamide to the melt viscosity of the polypropylene is 1 or more. The resin composition has improved heat resistance as compared with the polypropylene, but has no sufficient improvement in dimensional stability upon molding and rigidity.

Japanese Patent Application Kokai (Laid-Open) No. 146552/1991 discloses a resin composition comprising 40–80% by weight of a polyamide, 1–40% by weight of a modified polyolefine and 20–60% by weight of a polypropylene. The resin composition shows excellent coating property by having a melt viscosity ratio $\eta_{PP}/\eta_{PA}$ of 0.75 or more at a shear rate of 3,500 $sec^{-1}$ at the molding temperature, but is insufficient in impact resistance and dimensional stability upon molding.

Japanese Patent Application Kokai (Laid-Open) No. 207735/1991 discloses a resin composition comprising a polyamide, a polyolefine and a modified polyolefine. The modified polyolefine having a tensile yield strength of 300 $kg/cm^2$ or more improves mechanical properties, particularly, weld strength of a molded article made of the resin composition. However, the resin composition has high shrinkage coefficient upon solidification during molding, thereby the molded article having insufficient dimensional stability and rigidity.

Japanese Patent Publication No. 44108/1980 discloses a multi-phase thermoplastic resin composition having a polyamide matrix and particles dispersed therein. The particles are made of a polymer having at least one residue selected from ethylene, carbonyl compounds, α,β-unsaturated carboxylic acids and derivatives thereof, unsaturated epoxides, carboxylic acids and derivatives thereof, acrylic acid esters, monomers having aromatic side chains and unsaturated carbon-carbon monomers. The resin composition has excellent impact resistance and modulus of bending elasticity. However, the resin composition is insufficient in low water absorption; the resin composition does not have both mechanical properties and dimensional stability upon water absorption.

Japanese Patent Application Kokai (Laid-Open) No. 9661/1980 discloses a thermoplastic resin composition having flexibility, comprising (a) a modified ethylene copolymer grafted with 0.05–1.5% by weight of an α,β-unsaturated carboxylic acid or a derivative thereof and (b) a polyamide at a ratio of 2/3:1 to 6:1. The thermoplastic resin composition has improved flexibility and impact resistance but has reduced rigidity and elongation upon rupture.

Japanese Patent Application Kokai (Laid-Open) No. 123158/1979 discloses a polyolefine resin composition comprising: a polyolefine resin, including an unsaturated carboxylic acid-added polyolefine resin; a nitrogen-containing resin; and a filler. The polyolefine resin is superior in mechanical properties, heat resistance and coating property. The resin composition has improved bending strength, heat deformation temperature and coating property. However, the resin composition has problem in rigidity, toughness, lightweightness and dimensional stability.

Japanese Patent Application Kokai (Laid-Open) No. 232135/1984 discloses a polyolefine resin composition superior in dyeing property, comprising a modified polyolefine, a polyamide and a crystalline polyolefine, wherein the amount of the olefine units is 70% by weight or more of the total. The incorporation of a large amount of polyolefines improves, upon injection molding, mechanical strength, rigidity, heat resistance, etc. However, the extent of improvement is limited.

Japanese Patent Application Kokai (Laid-Open) No. 118735/1985 discloses a resin composition with both mechanical properties and low water absorption, comprising a polyamide and a modified polyolefine. The resin composition, however, is insufficient in balance between rigidity and low water absorption.

Japanese Patent Application Kokai (Laid-Open) No. 8246/1982 discloses a resin composition comprising a polyamide, a polyolefine having a crystallinity of 40% or more and a modified polyolefine obtained by modifying an ethylene-α-olefine copolymer having a crystallinity of 35% or less with an α,β-unsaturated carboxylic acid or a derivative thereof. The resin composition has improved impact resistance and appearance, but has no sufficient balance between rigidity and low water absorption.

Japanese Patent Application Kokai (Laid-Open) No. 149940/1984 (Japanese Patent Publication No. 42109/1990) and Japanese Patent Application Kokai (Laid-Open) No. 110740/-1985 (Japanese Patent Publication No. 42379/1990) disclose a polypropylene composition comprising a polypropylene, a polyamide and a modified propylene-α-olefine copolymer, which has excellent rigidity, impact resistance, gloss and heat resistance. The resin composition has a polypropylene matrix, thereby considerably low rigidity expressed by modulus of bending elasticity, as compared with a polyamide matrix.

As described above, conventional polyamide resin compositions are not well balanced between the properties possessed by a polyamide and the properties possessed by a polyolefine. The polyamide has favorable properties such as the mechanical properties, heat resistance and moldability, and the polyolefine has favorable properties such as the lightweightness and low water absorption. Neither the polyamide nor the polyolefine has low warpage upon molding, good dimensional stability and good impact resistance.

SUMMARY OF THE INVENTION

An object of the present invention is to provide a thermoplastic resin composite, which has both the properties possessed by a polyamide and the properties possessed by a polyolefine in good balance, and which further has properties that are not sufficiently possessed by the polyamide or polyolefine, specifically, low warpage upon molding, good dimensional stability and good impact resistance.

In the present invention, polyolefine grains are dispersed in a polyamide matrix, and each of the polyolefine grains has a so called core-shell structure wherein the shell is coated onto the surfaces of the core. In each of the grains, the core is made of an unmodified polyolefine, and the shell is made of another polyolefine that is modified so as to be compatible with the polyamide matrix. The polyolefine for the core has properties different from the other polyolefine for the shell in terms of flexibility. One of the polyolefines may be a crystalline polypropylene resin, and the other polyolefine may be a copolymer having ethylene units and α-olefine units.

In the first aspect of the present invention, the core is made of a crystalline polypropylene resin (C), and the shell is made of modified copolymer (B) having ethylene units and α-olefine units. The modified copolymer (B) may have the α-olefine units as a major component. The resin composite has 30 to 80 percents by weight of a polyamide (A), 1 to 30 percents by weight of the modified copolymer (B), and 19 to 69 percents by weight of the crystalline polypropylene resin (C) wherein a sum of the polyamide, the modified copolymer, and the crystalline propylene resin is 100 percents by weight.

In the second aspect of the present invention, the core is made of an unmodified copolymer (E) having ethylene units and α-olefine units, and the shell is made of a modified crystalline polypropylene resin (D). The copolymer may have the ethylene units as a major component. The resin composite has 30 to 80 percents by weight of polyamide (A), 5 to 50 percents by weight of the modified crystalline polypropylene resin (D), and 5 to 65 percents by weight of the copolymer (E) wherein a sum of the polyamide, the modified crystalline polypropylene resin, and the copolymer is 100 percents by weight.

The modification of the unmodified crystalline polypropylene resin (C) with at least one of α,β-unsaturated caboxylic acid and α,β-unsaturated caboxylate gives the modified crystalline polypropylene resin (D). A method of modifying the crystalline polypropylene resin (C) to give the modified crystalline polypropylene resin (D) is the same as that of modifying the first copolymer to give the modified copolymer (B).

The resin composite of the present invention contains the polyamide (A) forming the matrix so as to reflect favorable properties of a polyamide resin, such as the heat resistance and mechanical properties, thereby having improved modulus of elasticity, heat resistance and rupture strength. Contrarily, when the polyamide component (A) forms a discontinuous phase, the resulting resin composite has low mechanical properties and heat resistance, being unable to achieve the object of the present invention.

The core-shell structure in the resin composite of the present invention gives superior mechanical properties (e.g. modulus of bending elasticity, tensile and bending strengths and impact resistance), low viscosity of a melt and superior flow during molding. Contrarily, when both of the polyolefine components (B) and (C) or (D) and (E) are modified with a chemical having polar group that is compatible with the polyamide (A), each of the polyolefines are independently dispersed in the polyamide matrix; some particles are made of one polyolefine, and the other particles are made of another polyolefine.

The thermoplastic resin composite of the present invention has both the properties possessed by a polyamide and the properties possessed by a polyolefine in good balance and further has low warpage upon molding, good dimensional stability and good impact resistance.

DETAILED DESCRIPTION OF THE PREFERRED EMBODIMENTS

Figure 1:
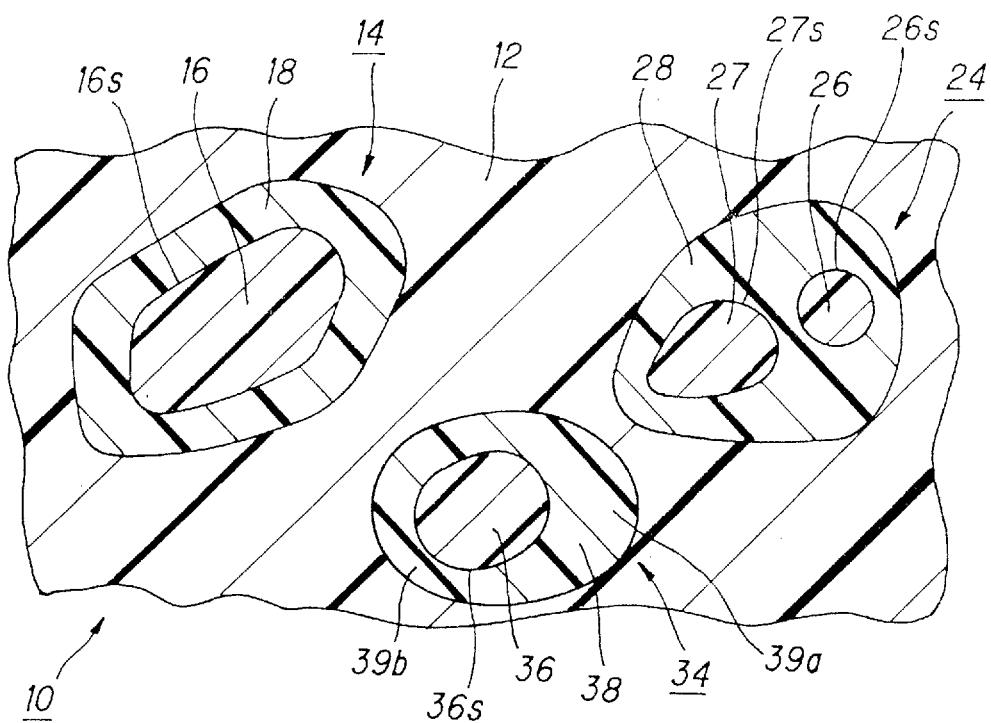
FIG. 1 is a cross section of the resin composite of the present invention.

In FIG. 1, a resin composite 10 includes a polyamide matrix 12, and polyolefine grains 14, 24, 34 are dispersed in the polyamide matrix 12. Each of the polyolefine grains 14, 24, 34 has a so-called core-shell structure wherein shells 18, 28, 38 are coated onto the surfaces 16s, 26s, 27s, 36s of cores 16, 26, 27, 36, respectively. The cores are made of an unmodified polyolefine, while the shells are made of a modified polyolefine. Each of the grains 14, 24, 34 has a granular shape.

Grain 14 has one core 16, while grain 24 has two cores 26, 27. In grain 14, the shell 18 has a substantially uniform thickness. In grain 34, the shell 38 has an uneven thickness; a part 39a is thicker than another part 39b.

Preferably the grains may have average diameters up to 5 μm, and further preferably the grains may have average diameters up to 3 μm. Further preferably the grains may have average diameters up to 2 μm. Preferably the cores may have average diameters up to 3 μm, and further preferably the cores may have average diameters up to 2 μm. Further preferably the cores may have average diameters up to 1.5 μm.

Figure 2:
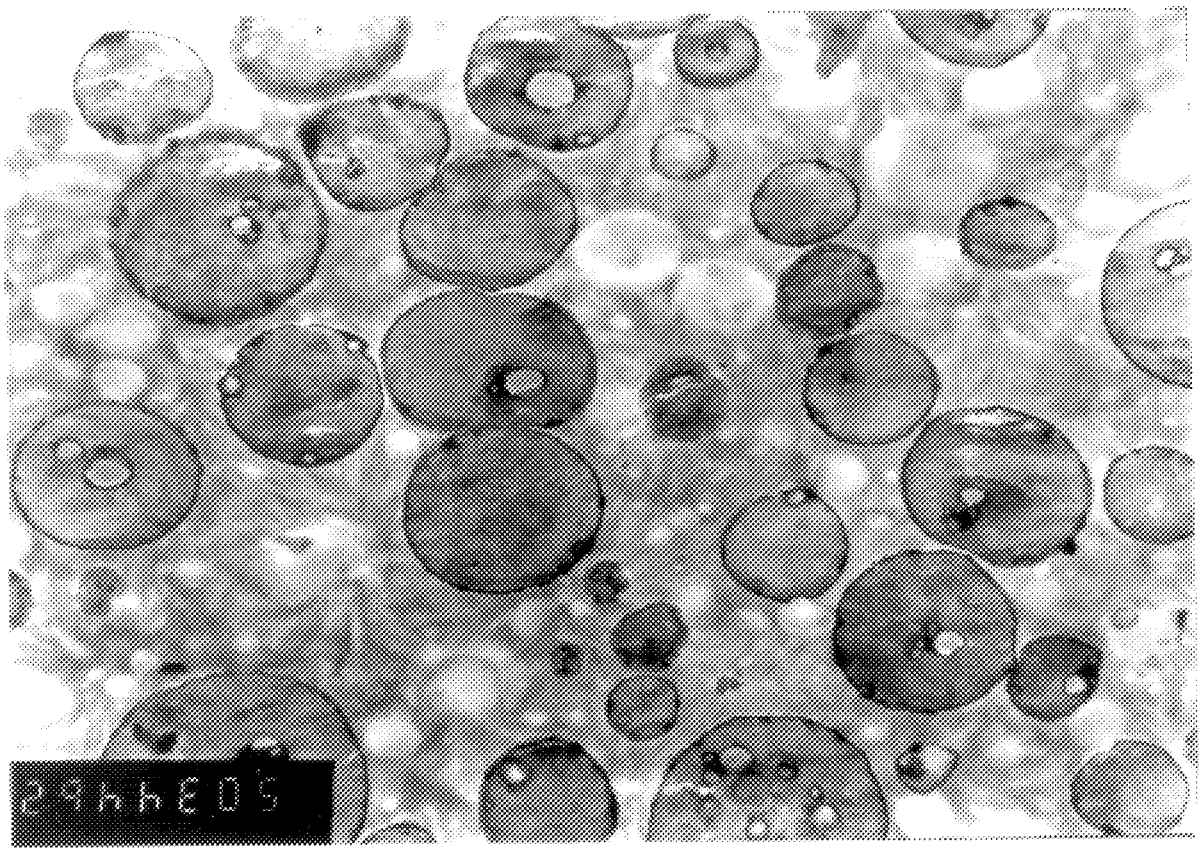
FIG. 2 is a photograph of transmission electron microscope of the resin composite of the first aspect of the present invention.
Figure 3:
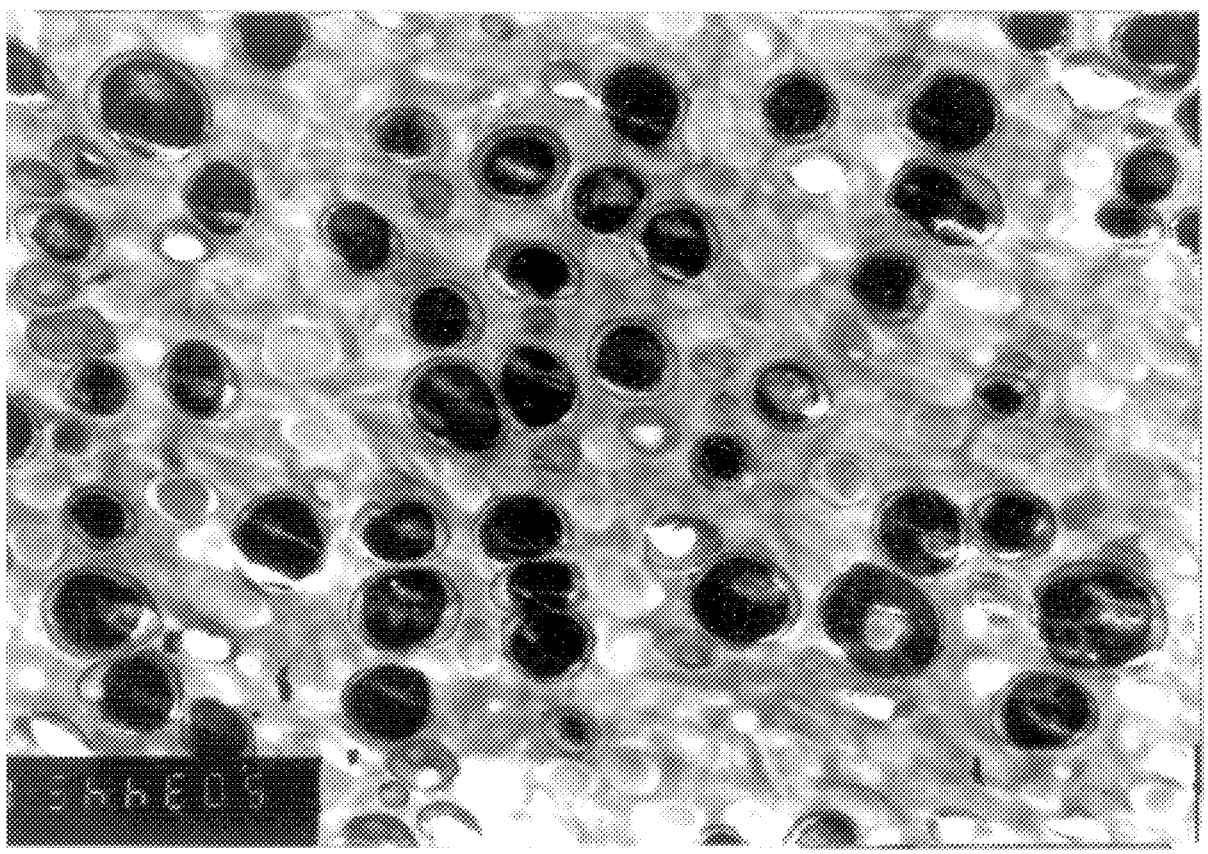
FIG. 3 is a photograph of transmission electron microscope of the resin composite of the second aspect of the present invention.
Figure 4:
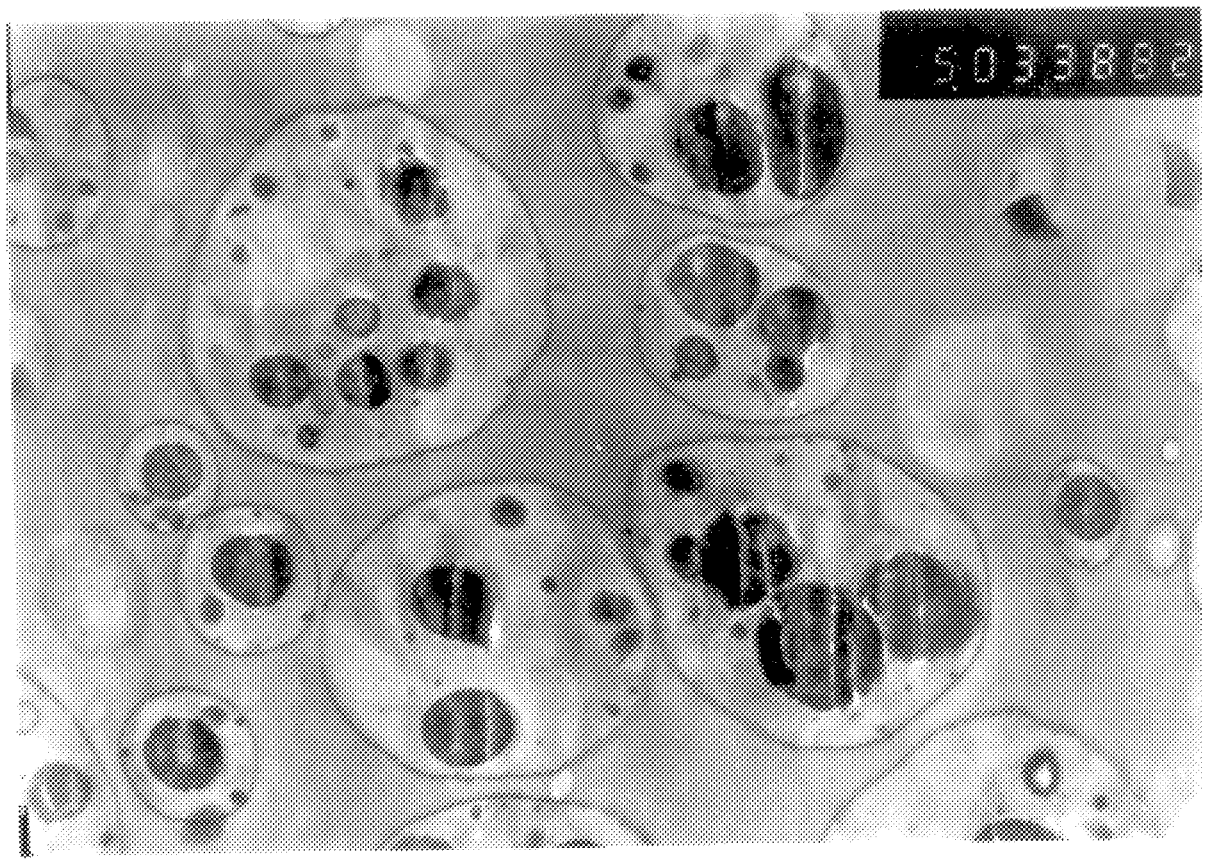
FIG. 4 is a photograph of transmission electron microscope of the resin composite of the first aspect of the present invention wherein a plurality of cores are present.

FIGS. 2, 3, and 4 are photographs of transmission electron microscope magnified by 15,000 times. Each grain has a black part, which corresponds to copolymers whether modified or not. The copolymers are dyed by ruthenium tetraoxide.

In FIG. 2, the core is made of a crystalline polypropylene resin (C), and the shell is made of modified copolymer (B) having ethylene units and α-olefine units. The modified copolymer (B) has the α-olefine units as a major component. In FIG. 2, many of the grains have diameters ranging from 2 μm to 3 μm.

In FIG. 2, most of the grains are occupied by the cores, and the black shell is thin having a thickness of about 0.02 μm. However, in the present invention, the shell can be thicker, depending on an amount of the modified copolymer, an amount of the modifying species, the composition of the modified copolymer, etc.

In FIG. 2, a few cores have a plurality of white area, which presumably corresponds to the polyamide incorporated in the cores. In the present invention, it is preferable that polyamide is not incorporated in the cores.

In FIG. 3, the black core is made of an unmodified copolymer having ethylene units and α-olefine units, and the shell is made of a modified crystalline polypropylene resin.

In FIG. 4, many of the grains have a plurality of black cores made of an unmodified copolymer. The size of one core can differ from the size of another core in the same grain.

The polyamide (A) may be obtained by polycondensation between (a) an aliphatic, alicyclic or aromatic diamine [e.g. hexamethylenediamine, decamethylenediamine, dodecamethylenediamine, 2,2,4- or 2,4,4-trimethylhexamethylenediamine, 1,3- or 1,4-bis (aminomethyl)cyclohexane, bis(p-aminocyclohexylmethane) or m- or p-xylylenediamine] and (b) an aliphatic, alicyclic or aromatic dicarboxylic acid (e.g. adipic acid, suberic acid, sebacic acid, cyclohexanedicarboxylic acid, terephthalic acid or isophthalic acid). Alternatively, the polyamide (A) may be obtained from a lactam, such as, ∈-caprolactam and ω-laurolactam. Alternatively, the polyamide (A) may be obtained by copolymerization of these chemicals, and the polyamide (A) may be a mixture of the polyamides and/or copolyamides.

The polyamide (A) may be, for example, nylon 6, nylon 66, nylon 46, nylon 610, nylon 612, nylon 9, nylon 11, nylon 12, nylon 6/66, nylon 66/610, nylon 6/9, nylon 6/11, nylon 6/12, nylon 6/610, nylon 6/612, nylon 6/66/610, nylon 6/66/12, nylon 6T (T: terephthalic acid component), nylon 6 I (I: isophthalic acid component), nylon 6/6T, nylon 6/6I, nylon 66/6T and nylon 66/6I. Of these, nylon 6, nylon 66, nylon 11, nylon 12, nylon 6/66, nylon 6T and nylon 66/6T are preferred in view of the moldability, balance in mechanical properties, and cost. Nylon 6, nylon 66, copolymers thereof and mixtures thereof are particularly preferred. The molecular weight of the polyamide (A) has no particular restriction but is preferably 1.0 or more, more preferably 2.0–4.0 in terms of relative viscosity as measured for a solution of 1 g/dl of the polyamide (A) in 98% sulfuric acid.

When the relative viscosity of the polyamide is less than 2.0, the resulting resin composite may have low mechanical strengths. When the relative viscosity is less than 1.0, the resin composite has significantly low mechanical strengths. When the relative viscosity is more than 4.0, the resin composite has high melt viscosity and low moldability.

The modified polyolefine used as the component (B) is a poly-α-olefine modified with an α,β-unsaturated carboxylic acid or a derivative thereof. It is obtained by modifying an α-olefine copolymer having a modulus of tensile elasticity of 200 MPa or less (obtained by copolymerizing at least two monomers selected from the α-olefines mentioned later) with an α,β-unsaturated carboxylic acid or a derivative thereof.

The α,β-unsaturated carboxylic acid or the derivative thereof includes univalent carboxylic acids such as acrylic acid, methacrylic acid, crotonic acid, isocrotonic acid and the like; divalent carboxylic acids such as maleic acid, fumaric acid, itaconic acid, citraconic acid and the like; and anhydrides or salts thereof. Of these, preferred are acrylic acid, methacrylic acid, maleic anhydride, itaconic anhydride, and zinc salts and sodium salts thereof. Particularly preferred are maleic anhydride and itaconic anhydride.

The content of the α,β-unsaturated carboxylic acid or the derivative thereof in the modified polyolefine (B) is preferably 0.05–5% by weight, particularly preferably 0.1–3% by weight. When the content of the α,β-unsaturated carboxylic acid or the derivative thereof is smaller than the above range, the adhesion between the polyamide and the polyolefine phase is insufficient and the resulting resin composite has an unstable dispersion structure and low mechanical strengths. When the content is larger than the above range, the resin composite gives a melt having high viscosity.

The modified polyolefine (B) can be obtained by stirring, with heating, a polyolefine of molten state or solution state together with an α,β-unsaturated carboxylic acid or its derivative both mentioned above and a radical initiator. The radical initiator may include, for example, organic peroxides such as hydroperoxide, dialkyl peroxide, peroxyester and the like. Specific examples thereof are benzoyl peroxide, dichlorobenzoyl peroxide, dicumyl peroxide, cyclohexanone peroxide and t-butylperoxybenzoate.

The α-olefine unit constituting the modified polyolefine (B), that is, the modified ethylene-α-olefine copolymer (B), is an α-olefine having 2 or more carbon atoms, particularly 2 to about 18 carbon atoms. The α-olefine unit can be, for example, ethylene, propylene, 1-butene, 1-hexene, 1-decene and 1-pentene. They can be used singly or in combination of two or more.

The unmodified polyolefine used for obtaining the modified polyolefine (B) is contains propylene units in an amount of 30–80 mole %, preferably 40–75 mole %, particularly preferably 45–75 mole %. When the propylene content is smaller than the above lower limit, the compatibility between the component (B) and the component (C) (described later) is insufficient, the dispersion structure of the resulting resin composite is unstable, and the mechanical strengths of the composite are small. When the propylene content is larger than the above upper limit, the resulting resin composite has small improvement in impact resistance, large shrinkage upon solidification during molding, and gives a molded article having low dimensional stability.

In the component (B), the probability that propylene units are present in three consecutive units in the polymer chain, is preferably 0.1–0.5. When the probability deviates from the range, the resulting resin composite may show no improvement in tensile strength or impact resistance.

Preferably, the component (B) is flexible at room temperature and has a tensile modulus of 200 MPa or less at 23° C. as measured by ASTM D 638. When the tensile modulus is larger than 200 MPa, the resulting resin composite has low impact resistance and shows, in some cases, no sufficient improvement in mold shrinkage coefficient or warpage upon molding.

The unmodified polyolefine, serving as the component (C) is a crystalline polyolefine, particularly a crystalline polypropylene. The component (C) preferably has a modulus of bending elasticity at 23° C. as measured by ASTM D 790, of 1 GPa or more, preferably 1.5 GPa or more. When the modulus of bending elasticity is less than 1 GPa, the resulting resin composite has low rigidity, being unable to achieve the object of the present invention.

The crystalline polypropylene resin, serving as the component (C), may be a propylene homopolymer. Alternatively, the component (C) may also be a block or random copolymer composed of propylene and 20 mole % or less of an α-olefine such as ethylene, 1-butene or the like.

The desired molecular weight of the component (C) is 1 g/10 min or more, preferably 10–100 g/10 min, more preferably 10–50 g/10 min in terms of melt flow rate (MFR) at a load of 2.16 kg at 230° C. as measured by ASTM D 1238. When the melt flow rate is smaller than 1 g/10 min, the polyolefine phase dispersed in the thermoplastic resin composite has large sizes and said resin composite has low rupture properties (e.g. low impact resistance). This undesirable phenomenon tends to appear already when the melt flow rate is in the range of 1–10 g/10 min. When the melt flow rate is larger than 100 g/10 min, the melt viscosity of the component (C) is too small as compared with that of the component (A), the presence of the component (A) in the form of a continuous phase is difficult, and the resulting resin composite has low mechanical strengths. This phenomenon tends to appear already when the melt flow rate is in the range of 50–100 g/10 min.

In the resin composite of the present invention, the component (C) is not modified with any polar group or any reactive group, unlike the component (B). When the component (C) is modified with a residue reactive or compatible with the polyamide (A), the polyolefine phase fails to take a core-shell structure in the resulting resin composite, and the advantageous properties polyolefine core-shell structure as described later is unobtainable.

In the first aspect of the present invention, the resin composite contains 30–80% by weight of the polyamide [the component (A)], 1–30% by weight of the modified polyolefine [the component (B)] and 19–69% by weight of the unmodified polyolefine [the component (C)], wherein the sum of the component (A), the component (B) and the component (C) is 100% by weight.

The proportion of the component (B) is preferably 3–20% by weight, more preferably 5–15% by weight. The proportion of the component (C) is preferably 19–50% by weight.

When the proportion of the component (A) is more than 80% by weight, the resulting resin composite does not have sufficient improvement in water absorption, so that a molded article has a large dimensional change upon moisture absorption. When the proportion of the component (A) is less than 30% by weight, the polyamide phase [the component (A)] fails to remain as a continuous phase so that the resulting resin composite has low mechanical properties and heat resistance.

When the proportion of the component (B) in the resin composite is less than 1% by weight, the compatibility between the polyamide component (A) and the component (B) is poor so that the resulting resin composite has low impact resistance and a large mold shrinkage coefficient. When the proportion of the component (B) is more than 30% by weight, the resulting resin composite has low modulus of bending elasticity, unable to achieve the object of the present invention.

In order to reliably avoid the above problems when the proportion of the component (B) is outside the specified range, the proportion of the component (B) should be in the above-mentioned preferable range, particularly in the above-mentioned more preferable range.

When the proportion of the component (C), i.e. the unmodified polyolefine in the resin composite of the present invention is more than 69% by weight, the component (C) forms a continuous phase, unable to obtain a resin composite superior in mechanical properties and heat resistance, intended by the present invention. When the proportion of the component (C) is less than 19% by weight, the resulting resin composite fails to have low water absorption and modulus of bending elasticity of intended levels.

In order to reliably avoid the above-mentioned problems when the proportion of the component (C) is outside the specified range, the proportion of the component (C) should be as well in the above-mentioned preferable range.

In the second aspect of the present invention, the unmodified polyolefine copolymer serving as the component (E) is an cα-olefine copolymer obtained by copolymerizing at least two monomers selected from the α-olefines mentioned later, and the unmodified polyolefine copolymer has a modulus of tensile elasticity at 23° C. of 200 MPa or less as measured by ASTM D 638.

The α-olefines constituting the copolymer of the component (E) are at least two α-olefines having 2 or more carbon atoms, particularly 2–18 carbon atoms, for example, ethylene, propylene, 1-butene, 1-pentene, 1-hexene, 1-heptene, 1-octene, 1-decene, etc. Of these olefine comonomers, ethylene is an essential comonomer and the other comonomer is preferably propylene or 1-butene.

The unmodified copolymer of component (E) contains 30–85 mole %, preferably 45–85 mole % of ethylene units. When the ethylene content is lower than the lower limit, the compatibility between the component (D) and the component (E) is insufficient so that the resulting resin composite has an unstable dispersion structure thereby having low mechanical strengths. When the ethylene content is higher than the upper limit, the resulting resin composite has small improvement in impact resistance, shows large shrinkage coefficient upon solidification during molding, and gives a molded article having low dimensional stability.

In order to reliably avoid these problems, the ethylene content should be in the preferable range.

In the component (E), the probability that α-olefine units other than ethylene units are present in any three consecutive units in the molecular chain, is preferably 0.5 or less. When the probability deviates from the range, the resulting resin composite may show no improvement in tensile strength or impact resistance.

Preferably, the component (E) is flexible at room temperature and has a modulus of tensile elasticity of 200 MPa or less at 23° C. as measured by ASTM D 638. When the modulus of tensile elasticity is higher than 200 MPa, the resulting resin composite may have low impact resistance, a large shrinkage coefficient upon molding and warpage upon molding.

The molecular weight of the component (E) is 0.5 g/10 min or more, preferably 2–60 g/10 min in terms of melt flow rate at a load of 2.16 kg at 230° C. as measured by ASTM D 1238. When the melt flow rate is smaller than 0.5 g/10 min, the polyolefine phase dispersed in the resin composite has large sizes thereby having low rupture properties (e.g. low impact resistance). This undesirable phenomenon tends to appear already when the melt flow rate is in the range of 0.5–2 g/10 min. When the melt flow rate is larger than 60 g/10 min, the melt viscosity of the component (E) is too small as compared with that of the component (A), the presence of the component (A) in the form of a continuous phase is difficult, and the resulting resin composite has low mechanical strength.

In the resin composite of the present invention, the component (E) is not modified with any polar group or any reactive group. When the component (E) is modified with a residue reactive or compatible with the polyamide (A), the polyolefine phase fails to take a core-shell structure in the resulting resin composite and the advantageous properties of polyolefine core-shell structure as described later is unobtainable.

In the second aspect of the present invention, the resin composite contains 30–80% by weight of the polyamide [the component (A)], 5–50% by weight of the modified polyolefine [the component (D)] and 5–65% by weight of the unmodified polyolefine [the component (E)], wherein the sum of the component (A), the component (D) and the component (E) is 100% by weight.

The proportion of the component (D) is preferably 10–45% by weight. The proportion of the component (E) is preferably 10–40% by weight.

When the proportion of the component (A) is more than 80% by weight, the resulting resin composite does not sufficiently improve water absorption, thereby giving a molded article having a large dimensional change upon moisture absorption. When the proportion of the component (A) is less than 30% by weight, the polyamide phase [the component (A)] fails to remain as a continuous phase and the resulting resin composite has low mechanical properties and heat resistance.

When the proportion of the component (D) in the resin composite is less than 5% by weight, the compatibility between the polyamide component (A) and the component (D) is poor so that the resulting resin composite fails to have water absorption and modulus of bending elasticity at desired levels. When the proportion of the component (D) is more than 50% by weight, it is impossible to obtain a resin composite having mechanical properties and heat resistance as intended by the present invention.

In order to reliably avoid the above problems occurring when the proportion of the component (D) is outside the specified range, the proportion of the component (D) should be in the above-mentioned preferable range.

When the proportion of the component (E), i.e. the unmodified polyolefine of the resin composite is more than 65% by weight, the component (E) forms a continuous phase so that the resulting resin composite has low modulus of bending elasticity, unable to achieve the object of the present invention. When the proportion of the component (E) is less than 5% by weight, the resulting resin composite has low impact resistance, thereby giving a large shrinkage coefficient upon molding.

There is no particular restriction in the process for producing the resin composite of the present invention, and the resin composite can be produced by various conventional processes. For example, the components (A), (B) and (C) or the components (A), (D) and (E) are subjected to preliminary mixing at room temperature. Subsequently, the mixture is subjected to melt kneading at a temperature at which each component sufficiently melts but at which each component does not decompose. For example, the temperature may be 220° C. or more, preferably at 240–300° C. In the preliminary mixing, a high-speed rotary mixer (e.g. a Henschel mixer) and a low-speed rotary mixer (e.g. a cone blender and a tumbler) may be used, both of which are used in ordinary mixing. In the melt kneading, a single-screw or double-screw extruder and an ordinary melt-kneading machine (e.g. a Banbury mixer or a kneader) may be used.

The resin composite of the present invention may contain a reinforcing agent and a filler each having such a shape or state as fiber, powder, flake, mat or the like as long as the moldability and properties of the composite is not impaired. Examples of the reinforcing agent and the filler include inorganic or metallic fibers such as glass fiber, asbestos fiber, carbon fiber, silica fiber, silica-alumina fiber, alumina fiber, zirconia fiber, boron nitride fiber, silicon nitride fiber, basic magnesium sulfate fiber, boron fiber, stainless steel fiber, aluminum fiber, titanium fiber, copper fiber, brass fiber, magnesium fiber and the like; organic fibers such as polyamide fiber, polyester fiber, polyacrylonitrile fiber, cellulose and the like; powders of metals such as copper, iron, nickel, zinc, tin, lead, stainless steel, aluminum, gold, silver and the like; fumed silica; aluminum silicate; glass beads; carbon black; quartz powder; talc; titanium oxide; iron oxide; calcium carbonate; magnesium oxide; calcium oxide; magnesium sulfate; and diatomaceous earth. When the reinforcing agent or the filler is a fibrous material, it preferably has an average fiber diameter of 0.1–30 µm and a fiber length/fiber diameter ratio of 10 or more. The reinforcing agent and the filler may have been subjected to a surface treatment with a known silane coupling agent or a titanate coupling agent.

The amount of the reinforcing agent and the filler used is 1–300 parts by weight, preferably 10–250 parts by weight per 100 parts by weight of the resin composite of the present invention. When the amount is less than 1 part by weight, no addition effect of the reinforcing agent or the filter is obtained. When the amount is more than 300 parts by weight, the resulting resin composite has reduced moldability and mechanical properties. The reinforcing agent and the filler may be used singly or in combination of two or more kinds.

The resin composite of the present invention may further contain, as necessary, at least one additive selected from oxidation inhibitors and heat stabilizers such as hindered phenols, hydroquinone, thioethers, phosphites, amines, derivatives thereof, copper compounds and the like; ultraviolet absorbers such as resorcinol, salicylates, benzotriazole, benzophenone and the like; releasing agents such as stearic acid, salts thereof, stearyl alcohol and the like; inorganic flame retardants such as magnesium hydroxide, calcium hydroxide, hydrotalcite and the like; organic flame retardants of halogen type, phosphoric acid ester type, melamine type or cyanuric acid type; auxiliary flame retardants such as antimony trioxide and the like; antistatic agents such as sodium dodecylbenzenesulfonate, polyalkylene glycol and the like; crystallization accelerators; dyes; pigments; and so forth.

The resin composite of the present invention may furthermore contain appropriate amounts of the following thermoplastic resin and the following thermosetting resin as long as the object of the present invention is not impaired. The thermoplastic resin includes polyethylene, ethylene-propylene copolymer, ethylene-1-butene copolymer, ethylene-4-methylene-1-pentene copolymer, ethylene-1-octene copolymer, ethylene-vinyl acetate copolymer, ethylene-vinyl alcohol copolymer, vinyl compound polymers (e.g. polyvinyl acetate and polyvinyl chloride), polyolefines (e.g. poly-1-butene and poly-4-methyl-1-pentene), polyamides, polyamide elastomers, thermoplastic polyesters (e.g. polyester elastomers, polyethylene terephthalate and polybutylene terephthalate), polycarbonates, polysulfone, polyphenylene ether, polyphenylene sulfide, etc. The thermosetting resin includes phenolic resin, melamine resin, urea resin, silicone resin, epoxy resin, etc.

The resin composite of the present invention has no particular restriction in the order that the components are mixed. All of the components may be mixed simultaneously. Alternatively, the components (A), (B) and (C) or the components (A), (D) and (E) may be mixed first to prepare a mixture, followed by addition of other components such as additives and the like.

The resin composite of the present invention can be subjected to injection molding, compression molding, extrusion or the like to obtain a molded article adapted to various applications.

The present invention is hereinafter described in more detail by way of Examples and Comparative Examples. However, the present invention is in no way restricted to these Examples as long as the scope of the present invention is observed.

The mechanical properties shown in Examples and Comparative Examples were measured as follows.
(1) Tensile properties (tensile strength and tensile modulus)
    Measured by ASTM D 638.
(2) Modulus of bending elasticity
    Measured by ASTM D 790.
(3) Heat distortion temperature
    Measured under a load of 4.6 kg/cm$^2$ by ASTM D 648.
(4) Izod impact strength
    Measured by ASTM D 256.
(5) Melt viscosity
    Measured at a shear rate of 240 sec$^{-1}$ at 280° C. by a plunger type capillary srheometer equipped with a nozzle having a nozzle diameter of 1 mm and a nozzle length of 10 mm.

(6) Shrinkage coefficient upon molding

An ASTM No. 1 test piece (thickness=⅛ inch) was prepared in a mold. The difference between the length of the test piece in the flow direction and the inside dimension of the mold in the flow direction was divided by the inside dimension so as to give a shrinkage coefficient (%) upon molding of the test piece in the flow direction.

(7) Warpage upon molding

A test piece was prepared by injection molding to give a disc shape having a thickness of 2 mm and a diameter of 100 mm. The test piece was measured for maximum warpage (mm) at the opposite ends by an apparatus for measuring three-dimensional size.

(8) Water absorption

An ASTM No. 4 test piece (thickness=1 mm) was prepared and absolutely dried. The test piece was kept in a thermo-hygrostat at a relative humidity of 90% at 40° C. for 190 hours. From the weight increase of the test piece between absolute drying before the thermo-hygrostat and after the thermo-hygrostat, the water absorption of the test piece was calculated using the following formula:

$$\text{Water absorption (\%)} = \frac{(\text{weight after water absorption} - \text{weight after absolute drying}) \times 100}{\text{weight after absolute drying}}$$

The properties of the polyamide [component (A)], the modified polyolefine [component(B)], the unmodified polyolefine [component C)], the modified polyolefine [component (D)] and unmodified polyolefine [component (E)] used in the following Examples and Comparative Examples were measured by the following methods.

(a) Relative viscosity ($\eta_r$)

Measured at 25° C. for a solution of 1 g/dl of a polymer in 98% sulfuric acid, according to JIS K 6810.

(b) Propylene content

The probability of three consecutive units in any three consecutive units were determined by $^{13}$C-NMR experiments. The three consecutive units include PPP, PPE, EPE, PEP, EEP and EEE wherein E and P refer to an ethylene unit and a propylene unit, respectively. The content of the propylene unit was calculated from the probability and expressed by percent by mole.

(c) Probability of three consecutive propylene units in components (B) and (E)

The probability of three consecutive propylene units, PPP, among the sum of the probabilities of any three consecutive units, such as PPP, PPE, EPE, PEP, EEP and EEE (E and P refer to ethylene unit and propylene unit, respectively) was calculated by $^{13}$C-NMR experiments and expressed by percent by mole.

(d) Amount of modifying species, i.e. maleic anhydride

Infrared absorption spectra were obtained. The amount was calculated from ratios of the absorbance at 1,785 cm$^{-1}$ and the absorbance at 840 cm$^{-1}$.

(e) Crystalline rate though X-ray diffraction

A press sheet made of the component had a thickness of 0.5 mm, and the press sheet underwent X-ray crystallography to obtain a diffraction spectra of 2 θ ranging from 5 to 35 degrees. A smooth curve having a peak at 16 degrees of 2 θ separate a crystalline region and an uncrystalline region, and the area of the crystalline region was measured.

(f) Melt flow rate (MFR)

Measured under a load of 2.16 kgf at 230° C. by a melt indexer according to ASTM D 1238, wherein 1 kgf is equivalent to 9.8 N.

EXAMPLES 1–5

Table 1 shows five kinds of ethylene-propylene copolymer rubbers (each of them is hereinafter abbreviated as "EPR"), wherein for each EPR, the propylene content, probability of the three consecutive propylene units, modifying species, amount of modifying species, X-ray crystallinity, melt flow rate and modulus of tensile elasticity are indicated.

Table 2 shows five kinds of crystalline polypropylene resins (each of them is hereinafter abbreviated as "PP"), wherein for each PP, the propylene content, melt flow rate, modulus of bending elasticity and amount of maleic anhydride are indicated.

As the polyamide [component (A)], nylon 66 (PA 66, $\eta_r$=2.51) was used. As the modified polyolefine [component (B)], there was used EPR 1 (propylene content =75 mole %, MFR =35 g/10 min, amount of modification with maleic anhydride =1.0 wt. %, X-ray crystallinity =21%, tensile modulus =120 MPa). As the unmodified polyolefine [component (C)], there was used PP 1 (type=homo PP, MFR=30 g/10 min, modulus of bending elasticity =1.9 GPa). They were dry-blended by a tumbler in the proportions shown in Table 3. The resulting blend was subjected to melt kneading at 280° C. by a double screw extruder having a diameter of 30 mm to obtain resin composites. The resin composites were dried and then injection-molded to prepare test pieces to be used for property measurements. The properties of the resin composites are shown in Table 3.

TABLE 1

Modified copolymer containing ethylenes units and α-olefin units (component B)

| type of EPR *1 | C3 content *2 (mol %) | PPP probablity *3 | modifying species | amount of modifying species (wt %) | crystalline rate *5 (%) | melt flow rate (g/10 min) | modulus of tensile elasticity (MPa) |
|---|---|---|---|---|---|---|---|
| EPR 1 | 75 | 0.43 | MAH *4 | 1.0 | 21 | 35 | 120 |
| EPR 2 | 55 | 0.22 | MAH | 0.5 | 3 | 20 | 30 |
| EPR 3 | 28 | 0 | MAH | 0.5 | 15 | 5 | 10 |
| EPR 4 | 28 | 0 | none | 0 | 15 | 2 | 10 |
| EPR 5 | 80 | 0.60 | MAH | 0.3 | 28 | 1 | 300 |

[Note]
*1: EPR refers to an ethylene-propylene copolymer rubber.
*2: C3 content refers to a propylene content in percent by mole in component B.
*3: PPP probability refers to a probability of three consecutive propylene units in any three consecutive units.
*4: MAH refers to maleic anhydride.
*5: Crystalline rate was measured by X-ray crystallography.

TABLE 2

Crystalline polypropylene resin (component C)

| type of PP *1 | type | C3 content (mol %) | melt flow rate (g/10 min) | modulus of bending elasticity (GPa) | an amount of maleic anhydride (wt %) |
|---|---|---|---|---|---|
| PP 1 | homo | 100 | 30 | 1.9 | 0 |
| PP 2 | homo | 100 | 5 | 1.8 | 0 |
| PP 3 | block | 96 | 20 | 1.5 | 0 |
| PP 4 | random | 95 | 5 | 0.6 | 0 |
| PP 5 | homo | 99 | 30 | 1.7 | 0.3 |

[Note]
*1: PP refers to cryaralline polypropylene resin.
*2: C3 content refers to a propylene content in percent by mole in component B.

TABLE 3

|  |  | Ex. 1 | Ex. 2 | Ex. 3 | Ex. 4 | Ex. 5 |
|---|---|---|---|---|---|---|
| polyamide (A) | (wt %) |  |  |  |  |  |
| PA66 |  | 70 | 60 | 50 | 40 | 50 |
| modified copolymer (B) | (wt %) |  |  |  |  |  |
| EPR 1 |  | 10 | 20 | 20 | 10 | 10 |
| crystalline propylene resin (C) | (wt %) |  |  |  |  |  |
| PP 1 |  | 20 | 20 | 30 | 50 | 40 |
| tensile strength | (MPa) | 52 | 41 | 35 | 38 | 50 |
| modulus of bending elasticity | (GPa) | 2.1 | 1.6 | 1.4 | 1.6 | 2.0 |
| izod impact strength | (J/m) | 100 | 240 | 230 | 60 | 180 |
| heat distortion temperature | (°C.) | 191 | 175 | 148 | 145 | 157 |
| viscosity of melt | (Pa · s) | 180 | 290 | 270 | 240 | 250 |
| mold shrinkage coefficient | (%) | 2.2 | 1.5 | 1.9 | 2.3 | 2.0 |
| warpage upon molding | (mm) | 1.5 | 1.1 | 2.3 | 2.8 | 2.6 |
| water absorption | (%) | 3.8 | 3.1 | 2.5 | 2.0 | 2.5 |

EXAMPLE 6

A resin composite having properties shown in Table 4 was obtained in the same manner as in Example 1 except that EPR 2 shown in Table 1 was used as component B and that the composite contains 60% by weight of component A, 15% by weight of component B and 25% by weight of component C.

Comparative Examples 1–3

Resin composites having properties shown in Table 4 were obtained in the same manner as in Example 6 except that EPR 3, EPR 4 and EPR 5 of Table 1 were used as component B in Comparative Examples 1, 2 and 3, respectively.

TABLE 4

|  |  | Ex. 6 | Comp. Ex. 1 | Comp. Ex. 2 | Comp. Ex. 3 |
|---|---|---|---|---|---|
| polyamide (A) | (wt %) |  |  |  |  |
| PA66 |  | 60 | 60 | 60 | 60 |
| modified copolymer (B) | (wt %) |  |  |  |  |
| EPR 2 |  | 15 | — | — | — |
| EPR 3 |  | — | 15 | — | — |
| EPR 4 |  | — | — | 15 | — |
| EPR 5 |  | — | — | — | 15 |
| crystalline propylene resin (C) | (wt %) |  |  |  |  |
| PP 1 |  | 25 | 25 | 25 | 25 |
| tensile strength | (MPa) | 48 | 39 | 25 | 49 |
| modulus of bending elasticity | (GPa) | 1.9 | 1.7 | 1.4 | 2.1 |

TABLE 4-continued

|  |  | Ex. 6 | Comp. Ex. 1 | Comp. Ex. 2 | Comp. Ex. 3 |
|---|---|---|---|---|---|
| Izod impact strength | (J/m) | 180 | 60 | 40 | 60 |
| heat distortion temperature | (°C.) | 184 | 152 | 151 | 190 |
| viscosity of melt | (Pa · s) | 270 | 400 | 480 | 370 |
| motd shrinkage coefficient | (%) | 1.8 | 2.2 | 2.7 | 3.0 |
| warpage upon molding | (mm) | 1.2 | 2.5 | 5.2 | 4.3 |
| water absorption | (%) | 3.1 | 3.1 | 3.3 | 3.1 |

EXAMPLES 7 and 8

Resin composites having properties shown in Table 5 were obtained in the same manner as in Example 6 except that PP 2 (homo PP) and PP 3 (block PP) of Table 2 were used as component C in Examples 7 and 8, respectively.

Comparative Examples 4 and 5

Resin composites having properties shown in Table 5 were obtained in the same manner as in Example 6 except that PP 4 (random PP) and PP 5 (maleic anhydride-modified PP) of Table 2 were used as component C in Comparative Examples 4 and 5, respectively.

TABLE 5

|  |  | Ex. 7 | Ex. 8 | Comp. Ex. 4 | Comp. Ex. 5 |
|---|---|---|---|---|---|
| polyamide (A) | (wt %) |  |  |  |  |
| PA66 |  | 60 | 60 | 60 | 60 |
| modified copolymer (B) | (wt %) |  |  |  |  |
| EPR 2 |  | 15 | 15 | 15 | 15 |
| crystalline propylene resin (C) | (wt %) |  |  |  |  |
| PP2 |  | 25 | — | — | — |
| PP3 |  | — | 25 | — | — |
| PP 4 |  | — | — | 25 | — |
| PP 5 |  | — | — | — | 25 |
| tensile strength | (MPa) | 45 | 43 | 30 | 40 |
| modulus of bending elasticity | (GPa) | 2.0 | 1.7 | 1.2 | 1.4 |
| Izod impact strength | (J/m) | 326 | 250 | 250 | 400 |
| heat distortion temperature | (°C.) | 179 | 173 | 131 | 150 |
| viscosity of melt | (Pa · s) | 250 | 250 | 300 | 450 |
| mold shrinkage coefficient | (%) | 2.2 | 2.0 | 1.8 | 3.0 |
| warpage upon molding | (mm) | 1.3 | 1.2 | 1.0 | 3.8 |
| water absorption | (%) | 3.1 | 3.2 | 3.3 | 3.1 |

EXAMPLE 9

A resin composite having properties shown in Table 6 was obtained in the same manner as in Example 1 except that the composite contains 50% by weight of component A, 5% by weight of component B and 45% by weight of component C.

Comparative Example 6

A resin composite having properties shown in Table 6 was obtained in the same manner as in Example 9 except that the proportion of component B was increased to 50% by weight and that no component C was used.

Comparative Example 7

A resin composite having properties shown in Table 6 was obtained in the same manner as in Example 9 except that the proportion of component C was increased to 50% by weight and that no component B was used.

Comparative Example 8

A resin composite having properties shown in Table 6 was obtained in the same manner as in Example 1 except that the proportion of component A was decreased to 25% by weight and that the proportion of component C was increased to 65% by weight.

TABLE 6

|  |  | Ex. 9 | Comp. Ex. 6 | Comp. Ex. 7 | Comp. Ex. 8 |
|---|---|---|---|---|---|
| polyamide (A) | (wt %) |  |  |  |  |
| PA66 |  | 50 | 50 | 50 | 25 |
| modified copolymer (B) | (wt %) |  |  |  |  |
| EPR 2 |  | 5 | 50 | — | 10 |
| crystalline propylene resin (C) | (wt %) |  |  |  |  |
| PP 1 |  | 45 | — | 50 | 65 |
| tensile strength | (MPa) | 52 | 26 | 49 | 41 |
| modulus of bending elasticity | (GPa) | 2.2 | 0.8 | 2.4 | 1.4 |
| Izod impact strength | (J/m) | 82 | 850 | 87 | 120 |
| heat distortion temperature | (CC) | 150 | 90 | 137 | 126 |
| viscosity of melt | (Pa · s) | 180 | 400 | 280 | 320 |
| mold shrinkage coefficient | (%) | 2.3 | 1.5 | 3.5 | 3.8 |
| warpage upon molding | (mm) | 2.0 | 0.8 | 9.0 | 7.5 |
| Water absorption | (%) | 2.4 | 2.7 | 2.4 | 1.5 |

EXAMPLES 10–13 and Comparative Examples 9–10

Resin composites having properties shown in Table 7 were obtained in the same manner as in Example 1 except that the kinds and proportions of component A, component B and component C shown in Table 7 were employed.

TABLE 7

|  |  | Ex. 10 | Ex. 11 | Ex. 12 | Ex. 13 | Comp. Ex. 9 | Comp. Ex. 10 |
|---|---|---|---|---|---|---|---|
| polyamide (A) | (wt %) |  |  |  |  |  |  |
| PA6 |  | 60 | 50 | 40 | 50 | 50 | 50 |
| modified copolymer (B) | (wt %) |  |  |  |  |  |  |
| EPR 1 |  | 20 | — | 10 | 10 | — | — |
| EPR 2 |  | — | 20 | — | — | 20 | — |
| EPR 4 |  | — | — | — | — | — | 10 |
| crystalline propylene resin (C) | (wt %) |  |  |  |  |  |  |
| PP 1 |  | 20 | 30 | — | — | — | — |
| PP 2 |  | — | — | 50 | 40 | — | 40 |
| PP 5 |  | — | — | — | — | 30 | — |
| tensile strength | (MPa) | 40 | 33 | 37 | 47 | 41 | 24 |
| modulus of bending elasticity | (GPa) | 1.5 | 1.3 | 1.5 | 1.9 | 1.6 | 1.2 |
| Izod impact strength | (J/m) | 280 | 260 | 80 | 210 | 300 | 40 |
| heat distortion temperature | (°C.) | 160 | 140 | 138 | 145 | 141 | 133 |
| viscosity of melt | (Pa · s) | 250 | 230 | 320 | 330 | 510 | 350 |
| mold shrinkage coefficient | (%) | 1.3 | 1.7 | 2.0 | 1.7 | 2.3 | 1.9 |
| warpage upon molding | (mm) | 0.7 | 1.5 | 1.8 | 2.4 | 3.0 | 3.1 |
| water absorption | (%) | 3.6 | 3.0 | 2.3 | 3.0 | 3.0 | 3.1 |

EXAMPLES 14–18

Table 8 shows five kinds of modified crystalline polypropylene resins (each of these resins is hereinafter abbreviated as "PP"), wherein the propylene content, MFR, modifier, amount of modification and modulus of bending elasticity of each PP are indicated.

Table 9 shows five kinds of ethylene-α-olefine copolymer rubbers (each of these rubbers is hereinafter abbreviated as "EPR"), wherein the ethylene content, fraction of three consecutive propylene units, X-ray crystallinity, MFR, tensile modulus, modifier and amount of modification of each EPR are indicated.

Nylon 66 (PA 66, $\eta_r$=2.51) was used as the polyamide (component A). As the modified polyolefine (component D), there was used PP 1 (kind=maleic anhydride-modified homo PP, MFR=30 g/10 min, amount of modification with maleic anhydride =0.2 wt. %, modulus of bending elasticity=1.9 GPa). As the unmodified polyolefine (component E), there was used EPR 1 (ethylene content=82 mole %, i.e. propylene content=18 mole %, MFR=9 g/10 min, tensile modulus=10 MPa). They were dry-blended by a tumbler in the proportions shown in Table 10. The resulting blend was subjected to melt kneading at 280° C. by a 30 -mm φ double screw extruder to obtain resin composites. The resin composites were dried and then injection-molded to prepare test pieces to be used for property measurements. The properties of the resin composites are shown in Table 10.

TABLE 8

Modified crystalline polypropylene resin (component D)

| type of PP *1 | type | propylene content *2 (mol %) | melt flow rate (g/10 min) | modifying species | an amount of modifying species (wt %) | modulus of bending elasticity (GPa) |
|---|---|---|---|---|---|---|
| PP 1 | homo | 100 | 30 | MAH *3 | 0.2 | 1.9 |
| PP 2 | homo | 100 | 10 | MAH | 0.4 | 1.9 |
| PP 3 | block | 96 | 20 | MAH | 0.3 | 1.5 |
| PP 4 | random | 95 | 30 | MAH | 0.4 | 0.6 |
| PP 5 | homo | 100 | 15 | none *4 | 0 | 1.7 |

[Note]
*1: PP refers to crystalline polypropylene resin.
*2: Propylene content refers to a propylene content in percent by mole in component D.
*3: MAH refers to maleic anhydride.
*4: none refers that the crystalline polypropylene resin PP5 is not modified.

TABLE 9

Unmodified copolymer containing ethylene units and α-olefin units (component E)

| type of EPR *1 | ethylene content *2 (mol %) | propylene content *3 (mol %) | comonomer | triad probability *4 | crystalline rate *7 (%) | melt flow rate (g/10 min) | modulus of tensile elasticity (MPa) | modifying species | an amount of modifying species (wt %) |
|---|---|---|---|---|---|---|---|---|---|
| EPR 1 | 82 | 18 | propylene | 0    | 0 | 9   | 10 | none *5 | 0 |
| EPR 2 | 52 | 48 | propylene | 0.14 | 0 | 0.5 | 15 | none | 0 |
| EPR 3 | 45 | 55 | propylene | 0.22 | 0 | 0.5 | 5  | none | 0 |
| EPR 4 | 82 | 18 | 1-butene  | 0    | 3 | 5   | 12 | none | 0 |
| EPR 5 | 81 | 19 | propylene | 0    | 4 | 5   | 10 | MAH *6 | 1.0 |

[Note]
*1: EPR refers to ethylene-propylene copolymer rubber.
*2: Ethylene content refers to ethylene content in component E.
*3: Propylene content refers to propylene content in component E.
*4: Triad probability refers to a probability that three consecutive units consists of propylene units and 1-butene units.
*5: None refers that the EPR is not modified.
*6: MAH refers to mateic anhydride.
*7: Crystalline rate was measured by X-ray crystallography.

TABLE 10

| | | Ex. 14 | Ex. 15 | Ex. 16 | Ex. 17 | Ex. 18 |
|---|---|---|---|---|---|---|
| polyamide (A) | (wt %) | | | | | |
| PA66 | | 70 | 60 | 50 | 40 | 50 |
| modified crystalline polypropylene resin (D) | (wt %) | | | | | |
| PP 1 | | 20 | 25 | 30 | 30 | 40 |
| copolymer (E) | (wt %) | | | | | |
| EPR 1 | | 10 | 15 | 20 | 30 | 10 |
| tensile strength | (MPa) | 60 | 54 | 45 | 44 | 47 |
| modulus of bending elasticity | (GPa) | 2.2 | 2.1 | 2.0 | 1.9 | 2.1 |
| Izod impact strength | (J/m) | 100 | 150 | 150 | 160 | 120 |
| heat distortion temperature | (°C.) | 157 | 151 | 150 | 145 | 180 |
| viscosity of melt | (Pa · s) | 180 | 290 | 162 | 240 | 176 |
| mold shrinkage coefficient | (%) | 2.2 | 1.5 | 1.9 | 2.3 | 2.0 |
| warpage upon molding | (mm) | 1.5 | 1.1 | 2.3 | 2.8 | 2.6 |
| water absorption | (%) | 5.3 | 4.3 | 3.7 | 3.8 | 2.6 |

EXAMPLES 19 and 20

Resin composites having properties shown in Table 11 were obtained in the same manner as in Example 14 except that PP 2 (homo PP) and PP 3 (block PP) of Table 8 were used as component D in Examples 18 and 19, respectively and that the proportions of component A, D and E were changed to those shown in Table 11.

Comparative Examples 11 and 12

Resin composites having properties shown in Table 11 were obtained in the same manner as in Example 19 except that PP 4 (random PP) and PP 5 (homo PP) of Table 8 were used as component D in Comparative Examples 11 and 12, respectively.

TABLE 11

|  |  | Ex. 19 | Ex. 20 | Ex. 11 | Comp. Ex. 12 | Comp. |
|---|---|---|---|---|---|---|
| polyamide (A) | (wt %) |  |  |  |  |  |
| PA66 |  |  | 55 | 55 | 55 | 55 |
| modified crystalline |  |  |  |  |  |  |
| polypropylene resin (D) | (wt %) |  |  |  |  |  |
| PP2 |  |  | 30 | — | — | — |
| PP 3 |  |  | — | 30 | — | — |
| PP 4 |  |  | — | — | 30 | — |
| PP 5 |  |  | — | — | — | 30 |
| copolymer (E) | (wt %) |  |  |  |  |  |
| EPR 1 |  |  | 15 | 15 | 15 | 15 |
| tensile strength | (MPa) |  | 48 | 45 | 25 | 35 |
| modulus of bending elasticity | (GPa) |  | 1.9 | 1.7 | 1.4 | 2.1 |
| Izod impact strength | (J/m) |  | 200 | 120 | 210 | 60 |
| heat distortion temperature | (°C.) |  | 148 | 152 | 140 | 133 |
| viscosity of melt | (Pa · s) |  | 162 | 180 | 170 | 160 |
| mold shrinkage coefficient | (%) |  | 1.8 | 2.2 | 1.7 | 3.0 |
| warpage upon molding | (mm) |  | 1.2 | 1.2 | 1.3 | 4.3 |
| water absorption | (%) |  | 3.9 | 3.9 | 4.0 | 3.8 |

EXAMPLES 21–23

Resin composites having properties shown in Table 12 were obtained in the same manner as in Example 14 except that EPR 2, EPR 3 and EPR 4 all shown in Table 9 were used as component E in Examples 21, 22 and 23, respectively and that the proportions of component A, D and E were changed to those shown in Table 12.

Comparative 13

A resin composite having properties shown in Table 12 was obtained in the same manner as in Example 21 except that maleic anhydride-modified EPR (EPR 5) shown in Table 9 was used as component E.

TABLE 12

|  |  | Ex. 21 | Ex. 22 | Ex. 23 | Comp. Ex. 13 |
|---|---|---|---|---|---|
| polyamide (A) | (wt %) |  |  |  |  |
| PA66 |  | 60 | 60 | 60 | 60 |
| modified crystalline | (wt %) |  |  |  |  |
| polypropylene resin (D) |  |  |  |  |  |
| PP 1 |  | 25 | 25 | 25 | 25 |
| copolymer (E) | (wt %) |  |  |  |  |
| EPR 2 |  | 15 | — | — | — |
| EPR 3 |  | — | 15 | — | — |
| EPR4 |  | — | — | 15 | — |
| EPR 5 |  | — | — | — | 15 |
| tensile strength | (MPa) | 48 | 47 | 49 | 38 |
| modulus of bending elasticity | (GPa) | 2.2 | 2.1 | 2.2 | 1.4 |
| Izod impact strength | (J/m) | 160 | 140 | 140 | 250 |
| heat distortion temperature | (°C.) | 155 | 150 | 151 | 138 |
| viscosity of melt | (Pa · s) | 160 | 170 | 150 | 450 |
| mold shrinkage coefficient | (%) | 2.2 | 2.0 | 1.8 | 2.8 |
| warpage upon molding | (mm) | 1.3 | 1.2 | 1.0 | 3.4 |
| water absorption | (%) | 3.1 | 3.2 | 3.2 | 3.2 |

EXAMPLE 24

A resin composite having properties shown in Table 13 was obtained in the same manner as in Example 14 except that the proportions of component A, component D and component E were changed to those shown in Table 13.

Comparative Example 14

A resin composite having properties shown in Table 13 was obtained in the same manner as in Example 24 except that no component D was used and that the proportion of component E was increased to 45% by weight.

Comparative Example 15

A resin composite having properties shown in Table 13 was obtained in the same manner as in Example 24 except that no component E was used.

Comparative Example 16

A resin composite having properties shown in Table 13 was obtained in the same manner as in Example 24 except that the proportions of component A, component D and component E were changed to those shown in Table 13.

TABLE 13

|  |  | Ex. 24 | Comp. Ex. 14 | Comp. Ex. 15 | Comp. Ex. 16 |
|---|---|---|---|---|---|
| polyamide (A) | (wt %) |  |  |  |  |
| PA66 |  | 55 | 55 | 55 | 25 |
| rnodified crystalline |  |  |  |  |  |
| polypropylene resin (D) | (wt %) |  |  |  |  |
| PP1 |  | 45 | — | 45 | 65 |
| copolymer (E) | (wt %) |  |  |  |  |
| EPR 1 |  | 5 | 45 | — | 10 |
| tensile strength | (MPa) | 52 | 49 | 26 | 41 |
| modulus of bending elasticity | (GPa) | 2.2 | 2.4 | 0.8 | 1.4 |
| Izod impact strength | (J/m) | 82 | 87 | 850 | 120 |
| heat distortion temperature | (°C.) | 150 | 137 | 90 | 126 |
| viscosity of melt | (Pa · s) | 160 | 280 | 400 | 320 |
| mold shrinkage coefficient | (%) | 2.2 | 3.5 | 1.5 | 3.8 |
| warpage upon molding | (mm) | 1.3 | 9.0 | 0.8 | 7.5 |
| water absorption | (%) | 3.1 | 2.4 | 2.7 | 1.5 |

EXAMPLES 25–28 and Comparative Examples 17–18

Resin composites having properties shown in Table 14 were obtained in the same manner as in Example 14 except that nylon 6 (PA 6, $\eta_r$ =2.3) was used as component A and that the proportions of component A, component D and component E were changed to those shown in Table 14.

TABLE 14

|  |  | Ex. 25 | Ex. 26 | Ex. 27 | Ex. 28 | Comp. Ex. 17 | Comp. Ex. 18 |
|---|---|---|---|---|---|---|---|
| polyamide (A) | (wt %) |  |  |  |  |  |  |
| PA6 |  | 60 | 50 | 40 | 50 | 50 | 50 |
| modified crystalline |  |  |  |  |  |  |  |
| polypropylene resin (D) | (wt %) |  |  |  |  |  |  |
| PP 1 |  | 20 | — | 50 | 40 | — | — |
| PP 2 |  | — | 30 | — | — | 30 | — |
| PP 4 |  | — | — | — | — | — | 40 |
| copolymer (E) | (wt%) |  |  |  |  |  |  |
| EPR 1 |  | 20 | 20 | — | — | — | — |
| EPR 2 |  | — | — | 10 | 10 | — | 10 |
| EPR 3 |  | — | — | — | — | 20 | — |
| tensile strength | (MPa) | 46 | 41 | 40 | 50 | 40 | 25 |
| modulus of bending elasticity | (GPa) | 2.1 | 1.9 | 1.8 | 2.2 | 1.6 | 1.2 |
| Izod irnpact strength | (J/m) | 190 | 190 | 80 | 210 | 300 | 40 |
| heat distortion temperature | (°C.) | 151 | 148 | 130 | 151 | 141 | 133 |
| viscosity of melt | (Pa · s) | 160 | 170 | 180 | 180 | 500 | 160 |
| mold shrinkage coefficient | (%) | 1.3 | 1.7 | 2.0 | 1.7 | 2.3 | 1.9 |
| warpage upon molding | (mm) | 0.7 | 1.5 | 1.8 | 2.4 | 3.0 | 3.1 |
| water absorption | (%) | 4.3 | 4.5 | 2.8 | 3.5 | 3.5 | 4.5 |

The resin composite of the present invention is superior in low water absorption, dimensional stability, lightweightness, mechanical properties (e.g. rigidity and toughness) and moldability. The resin composite can be used in mechanical parts, automobile parts, electrical or electronic parts, etc. and is particularly suited for use in electric or electronic parts for automobiles.

EXAMPLES 29–32

In Examples 29 and 30, the EPR have propylene content of 23 percents and 50 percents by mole in component (B), respectively. In Examples 31 and 32, the EPR have propylene content of 23 percents and 65 percents by mole in component (E), respectively.

TABLE 15

|  |  | Ex. 29 | Ex. 30 | Ex. 31 | Ex. 32 |
|---|---|---|---|---|---|
| polyamide (A) | (wt %) | | | | |
| PA66 | | 70 | 70 | 70 | 70 |
| modified copolymer (B) | (wt %) | | | | |
| EPR | | 20 | 20 | — | — |
| crystalline propylene resin (C) | (wt %) | | | | |
| PP | | 10 | 10 | — | — |
| modified crystalline polypropylene resin (D) | (wt %) | | | | |
| PP | | — | — | 20 | 20 |
| copolymer (F) | (wt %) | | | | |
| EPR | | — | — | 10 | 10 |
| number of cores | | single | plural | single | plural |
| tensile strength | (MPa) | 42 | 44 | 52 | 45 |
| modulus of bending elasticity | (GPa) | 1.7 | 1.8 | 2.2 | 1.9 |
| Izod impact strength | (J/m) | 310 | 1,100 | 110 | 80 |

What is claimed is:

1. A resin composite comprising:
a matrix consisting essentially of 30–80 percent by weight of a polyamide having
a plurality of grains dispersed therein, each of said grains consisting essentially of:
  a core consisting essentially of 19–69 percent by weight of a crystalline polypropylene resin having modulus of bending elasticity at 23° C. of at least 1 GPa; and
  a shell, coated onto surfaces of the core, consisting essentially of 1–30 percent by weight of a modified copolymer, said modified copolymer being made by modifying a copolymer comprising ethylene units and α-olefine units and having a modulus of tensile elasticity at 23° C. of up to 200 MPa with at least one of an α,β-unsaturated carboxylic acid and an α,βunsaturated carboxylate.

2. A resin composite according to claim 1, wherein the grains have average diameters of up to 5 μm.

3. A resin composite according to claim 2, wherein the core has an average diameter of up to 3 μm.

4. A resin composite according to claim 2, wherein the core has an average diameter of up to 2 μm.

5. A resin composite according to claim 1, wherein at least one of the grains contains a plurality of cores.

6. A resin composite according to claim 1, wherein the copolymer contains 30–80 mole % of propylene units.

7. A resin composite according to claim 1, wherein the copolymer contains 40–70 mole % of propylene units.

8. A resin composite according to claim 1, wherein the crystalline polypropylene resin has a melt flow rate of at least 1 gram per 10 minutes under tension of 2.16 kgf at 230° C.

9. A resin composite according to claim 1, wherein the modified copolymer contains 0.05–5 percent, based on the weight of the modified copolymer, of at least one of an α,β-unsaturated carboxylic acid and an α,β-unsaturated carboxylate.

10. A resin composite according to claim 1, wherein the composite contains 19–50 percent by weight of the crystalline polypropylene resin and 3–20 percent by weight of the modified copolymer.

11. A resin composite comprising:
a matrix essentially consisting of 30–80 percent by weight of polyamide having a plurality of grains dispersed therein, each of said grains consisting essentially of:
  a core essentially consisting of 5–65 percent by weight of a copolymer comprising ethylene units and α-olefin units, and having modulus of tensile elasticity at 23° C. of up to 200 MPa; and
  a shell, coated onto surfaces of the core, consisting essentially of 5–50 percent by weight of a modified crystalline polypropylene resin, made by modifying a crystalline polypropylene resin having a modulus of bending elasticity at 23° C. of at least 1 GPa, with at least one of an α,β-unsaturated carboxylic acid and an α,β-unsaturated carboxylate.

12. A resin composite according to claim 11, wherein the grains have average diameters of up to 5 μm.

13. A resin composite according to claim 12, wherein the cores have average diameters of up to 3 μm.

14. A resin composite according to claim 13, wherein the cores have average diameters of up to 2 μm.

15. A resin composite according to claim 11, wherein at least one of the grains contains a plurality of cores.

16. A resin composite according to claim 11, wherein the copolymer comprises 30–85 mole % of ethylene units.

17. A resin composite according to claim 16, wherein the copolymer comprises 45–85 mole % of ethylene units.

18. A resin composite according to claim 11, wherein the crystalline polypropylene resin has a melt flow rate of at least 1 gram per 10 minutes under a tension of 2.16 kgf at 230° C.

19. A resin composite according to claim 11, wherein the modified crystalline polypropylene resin includes 0.05–5 percent by weight, based on the weight of the modified copolymer, of at least one of an α,β-unsaturated carboxylic acid and an α,β-unsaturated carboxylate.

20. A resin composite according claim 11, wherein the composite comprises 10–40 percent by weight of the crystalline polypropylene resin and 10–45 percent by weight of the modified copolymer.

* * * * *